United States Patent [19]

Gibbard

[11] Patent Number: 5,180,803

[45] Date of Patent: Jan. 19, 1993

[54] STABILIZATION OF FLUOROPOLYMERS

[75] Inventor: Howard C. Gibbard, Hertfordshire, England

[73] Assignee: Imperial Chemical Industries PLC, London, England

[21] Appl. No.: 739,056

[22] Filed: Aug. 1, 1991

[30] Foreign Application Priority Data

Aug. 3, 1990 [GB] United Kingdom ............... 9017156

[51] Int. Cl.$^5$ .......................... C08F 8/00; C08F 6/14
[52] U.S. Cl. ................................. 528/488; 526/214; 526/249; 526/250; 526/255; 528/486; 528/489; 528/490
[58] Field of Search .................. 526/214, 249, 255; 528/486, 488, 489, 490; 521/46

[56] References Cited

U.S. PATENT DOCUMENTS

| | | | |
|---|---|---|---|
| 3,752,789 | 8/1973 | Khan | 528/488 |
| 4,384,092 | 5/1983 | Blaise et al. | 526/255 |
| 5,118,788 | 6/1992 | Hosokawa et al. | 528/503 |

Primary Examiner—Paul R. Michl
Assistant Examiner—Andrew E. C. Merriam
Attorney, Agent, or Firm—Cushman, Darby & Cushman

[57] ABSTRACT

A method for the stabilization and isolation of a fluoropolymer bearing carboxylic acid ($-CO_2H$) groups and prepared as an aqueous dispersion using a dispersion polymerization process which employs a dispersing agent whose dispersion-stabilizing effect is removable by heating the dispersion and an initiator (or initiator system) which yields carboxylic acid groups on the fluoropolymer, which method comprises, after preparing an aqueous dispersion of the fluoropolymer using dispersion polymerization, converting the carboxylic acid groups on the fluoropolymer in the aqueous dispersion to carboxylate anion groups ($-CO_2-$) using a base and then heating the so-modified fluoropolymer dispersion to cause simultaneously:

1) substantial removal of carboxylate anion groups, thereby to yield stable groups in their place, and
2) isolation of the fluoropolymer from the dispersion by coagulation (agglomeration) of the fluoropolymer dispersion.

8 Claims, No Drawings

STABILIZATION OF FLUOROPOLYMERS

The present invention relates to a method for the simultaneous stabilisation and isolation of fluoropolymers.

It is well known in the art that fluoropolymers, such as homo- and copolymers of tetrafluoroethylene (TFE), have outstanding chemical and physical properties. Certain fluoropolymers, such as certain copolymers of TFE and higher perfluorinated alpha-olefines (such as hexafluoropropylene, HFP) or TFE and perfluoroalkyl vinyl ethers such as perfluoro (methyl vinyl ether), PPVE) are melt-processable and can thus be fabricated at high temperatures using conventional melt fabrication techniques such as extrusion and moulding (in contrast to other fluoropolymers such as TFE homopolymer, PTFE, which are not melt-fabricatable and require special fabrication techniques).

It is also well known that many fluoropolymers tend to suffer from a potential degree of thermal instability due to the presence of certain unstable groups which are introduced into the polymer as a result of the polymerisation process to form the fluoropolymer. It is well understood that a major culprit in this respect in the presence of carboxylic acid ($-CO_2H$) groups bound directly to the fluoropolymer chains after polymerisation, these being particularly situated (it is believed) at the ends of the fluoropolymer chains. These groups are thermally unstable and tend to decompose to eliminate carbon dioxide at elevated temperatures.

This is not really a problem in the case of the non-melt-fabricatable type of fluoropolymer (eg PTFE), because the special techniques needed for fabrication, and also the very high molecular weight of such polymers (giving a very low concentration of end groups anyway), tend to make any defects resulting from $-CO_2H$ decomposition non-apparent; however, it is certainly a problem in the case of melt-fabricatable fluoropolymers (which are usually of considerably lower molecular weight). With this latter type of fluoropolymer, the elimination of gas during high temperature melt-processing results in bubbling and/or voiding and consequently an undesirable deterioration in the properties and/or appearance of the resulting fabricated product.

The presence of carboxylic acid groups in fluoropolymers is known to be caused by the use of certain initiators which are commonly employed for the polymerisations to form the fluoropolymers, particularly initiators or initiator systems consisting of or comprising certain peroxy compounds.

Examples of such peroxide initiator compounds are inorganic persulphates such as ammonium, potassium or sodium persulphate.

The removal of unstable end groups has long been an important part of the technology of melt-processable fluoropolymers. Thus, in US patent 3085083 there is described a method of treating fluorocarbon polymers having carboxyl end groups with water, preferably in the presence of inorganic compounds having a pH of at least 7 such as stable bases, basic salts, and neutral salts, at a temperature of 200° C.-400° C., and recovering a fluorocarbon polymer having at least half of all the end-groups in the form of stable difluoromethyl groups ($-CF_2H$).

However, it is apparent from the examples and description of U.S. Pat. No. 3085083 that the described treatment is applied to the fluoropolymer from polymerisation only after the bulk of the aqueous phase has first been removed: thus the heat treatment can be applied to the dewatered fluoropolymer from polymerisation, eg in the form of "wet fluff", which has then been admixed with sufficient water to create an aqueous slurry, or the dry basified fluoropolymer can be treated with steam at the elevated temperature.

However, such a process is time consuming, capital intensive, and the product is often difficult to remove from the treatment equipment after the elevated thermal treatment (in that it tends to stick thereto).

The production of fluoropolymers such as TFE homo- and copolymers is normally carried out by two distinct and different types of polymerisation process.

In one, termed granular polymerisation, the polymerisation of the fluoromonomer(s), eg TFE (and comonomer, if used), is performed in an aqueous medium in the presence of little or no dispersing (emulsifying) agent under conditions which cause the precipitation of agglomerated particles of up to several hundred microns in diameter.

In the other, termed dispersion polymerisation, the polymerisation of the fluoromonomer(s), eg TFE (and comonomer, if used), is carried out in the presence of a dispersing (emulsifying) agent to form a stable aqueous dispersion of the polymer particles which are of colloidal or near colloidal size (eg up to 2 microns, or more usually, sub- micron in diameter); typical dispersion particles are spherical, monodisperse and often have an average particle size below 0.2 microns, eg 0.05 to 1.5 microns.

The dispersing agent used in this type of polymerisation process besides being involved in the mechanism of polymerisation and particle formation also acts to stabilise the resulting latex particles in the final dispersion.

The resulting aqueous latex is then often coagulated to a floating particulate body of agglomerated colloidal particles and, after dewatering to a damp powder, dried to a dry powder before use in subsequent fabrication processes.

We have now discovered a novel and highly economic technique which is applied to an aqueous carboxyl-containing fluoropolymer dispersion made by dispersion polymerisation in which the fluoropolymer is stabilised an isolated simultaneously, i.e. in a single process stage.

According to the present invention there is provided a method for the stabilisation and isolation of a fluoropolymer bearing carboxylic acid ($-CO_2H$) groups and prepared as an aqueous dispersion using a dispersion polymerisation process which employs a dispersing agent whose dispersion-stabilising effect is removable by heating the dispersion and an initiator (or initiator system) which yields carboxylic acid groups on the fluoropolymer, which method comprises, after preparing an aqueous dispersion of the fluoropolymer using dispersion polymerisation, converting the carboxylic acid groups on the fluoropolymer in the aqueous dispersion to carboxylate anion groups ($-CO_2-$) using a base and then heating the so-modified fluoropolymer dispersion to cause simultaneously:

(1) substantial removal of carboxylate anion groups, thereby to yield stable groups in their place, and (2) isolation of the fluoropolymer from the dispersion by coagulation (agglomeration) of the fluoropolymer dispersion.

By isolation is meant separation, while in the aqueous dispersion, of the fluoropolymer from the bulk of the aqueous phase. By coagulation (one could alternatively use the word agglomeration) of the fluoropolymer dispersion is meant that the dispersed fluoropolymer colloidal particles are converted to agglomerates of the colloidal particles in the aqueous phase.

The significant advantage of the method of the present invention is that it, in effect, compresses the isolation and stabilisation stages of the fluoropolymer handling into a single process stage, thereby achieving considerable economies in time and capital equipment, while allowing an extremely facile work-up procedure.

It is essential in the method of the invention that the dispersing agent(s) used for the dispersion polymerisation, and which ends up stabilising the dispersed particles in the resulting fluoropolymer latex, is of a type(s) whose dispersion-stabilising influence is removable when the dispersion is heated at an elevated temperature, and more particularly when the dispersion is heated under the conditions to remove the carboxylate anion groups on the fluoropolymer.

Consequently, in the method of the invention, when the fluoropolymer dispersion is heated to remove the carboxylate anion groups, the dispersion-stabilising influence of the dispersing agent is removed, so that the latex becomes destabilised and coagulates (or agglomerates) to isolate the fluoropolymer as agglomerated particles floating in the aqueous phase.

The agglomerated particles can thereafter be readily removed from the bulk of the aqueous phase merely by techniques such as decantation or filtration.

Examples of dispersing agents which possess the required heat-removable dispersion-stabilising influence include ammonium or alkali metal (Na,K) salts of higher (eg $C_5$–$C_{18}$, particularly $C_6$–$C_{10}$) perfluoroalkanoic acids, such as ammonium perfluorooctanoate ($C_7F_{15}CO_2$—$NJ_4+$), ammonium perfluorononanoate ($C_8F_{17}CO_2$—$NH_4+$), and ammonium perfluorodecanoate ($C_9F_{19}CO_2\ NH_4+$). Under the action of the heat treatment stage applied to the dispersion to effect removal of the carboxylate anion groups on the fluoropolymer, it is believed (and indeed confirmed by experiment) that such perfluoroalkanoates are converted to their corresponding 1H-perfluoroalkanes by decomposition of the carboxylate groups (eg to 1H-perfluoroheptane $C_7F_{15}H$ in the case of using ammonium perfluorooctanoate $C_7H_{15}CO_2$—$NH_430$ as dispersing agent).

The dispersion-stabilising influence of the dispersing agent is thus removed, with the consequential destabilisation and coagulation (agglomeration) of the dispersion simultaneously with the removal of the fluoropolymer-bound carboxylate groups.

The initiator used for the emulsion polymerisation will often be or include an inorganic persulphate such as ammonium, K or Na persulphate (alone, or in combination with other peroxide initiators, or as part of a redox initiator system).

The use of such initiators or initator systems will result in fluoropolymer chain-bound carboxyl groups as discussed supra.

The base used to form the carboxylate anion groups may be any that is found to be suitable for effecting the defined method of the invention, and the choice of the cation of the base will determine the temperature conditions required for the effective carboxyl-removing heat treatment stage of the method.

Preferred examples of bases to use are the hydroxides of alkali or alkaline earth metals (ie Group I or II), particularly the hydroxides of Group I metals because of their water-solubility. Such bases are of the strong base type. Of these, NaOH and KOH are particularly preferred because of their solubility, low cost and low decomposition temperature of the resulting metal carboxylate group. Other bases which can be used include strong bases such as the Group I or Group II metal phosphates and weak bases such as the Group I and II carbonates or bicarbonates. Again, Na and K are the favoured metals.

Weak bases derived from organic acids may also be used, and indeed may sometimes be preferred.

Examples of these include the $C_1$–$C_{10}$ (preferably $C_1$–$C_8$) monocarboxyl acids (such as alkanoates) or polycarboxyl acid (eg $C_1$ formates, $C_2$ acetates, $C_4$ oxalates. $C_8$ octanoates) with the acetates being particularly favoured. Again, the Na and K derivatives are the favoured examples of such organic acid-derived bases.

According to whether a strong or weak base is employed in the method of the invention, a somewhat different treatment regime (with regard to factors such as the quantity of base used and the pH control of the dispersion) will normally be needed.

Addressing first the use of a strong base, such as a Group I or II metal hydroxide, in the method of the invention:

When using a strong base it is preferred that the final pH of the modified dispersion prior to the thermal decomposition treatment (in which the polymer-bound carboxylic acid groups are converted to carboxylate anion groups) is within the pH range of from 4 to 10 (more preferably 4 to 9, particularly 6 to 8).

This is because the direct addition of a strong base to the initial dispersion will cause the pH to rise from typically about 2–2.5 to >11, and it has been found that the final colour of the fluoropolymer can be affected by the pH at which the thermal decomposition treatment step is conducted; more specifically under strongly alkaline conditions the final fluoropolymer dispersion (viz after the thermal carboxylate anion decomposition treatment) may be discoloured-implying the presence of complexes of transition metals (which can arise when using reactor autoclaves made from stainless steel, which can contain metals such as Cr, Ni and Mn besides Fe, by surface dissolution under the hot alkaline treatment conditions). It is therefore advantageous to ensure that the pH of the aqueous phase prior to heating to the thermal carboxlate anion decomposition treatment temperature (eg before heating to above 100° C.) is within the range as discussed immediately supra.

Bearing the above in mind the following two embodiments are preferably adopted when using a strong base in the method of the invention.

In the first embodiment, sufficient strong base is added to the initial aqueous dispersion to raise the pH (usually from a minimum of about 2) to above 11. This will usually involve the addition of between 0.25g to 5g (typically 1.5 to 2.5g) of base per litre of dispersion.

The addition is made at a dispersion temperature of usually 60° to 100° C. (preferably 60° to 95° C., particularly 70° to 95° C.) and the mixture is held within this range for a period sufficient to cause substantially complete conversion of carboxylic acid groups to carboxylate anion groups (usually between 0.5 and 3 hours). After this time period, the pH of the dispersion is reduced by the addition of a strong acid, usually a strong mineral acid such as sulphuric, nitric or phosphoric acid, to a pH value of between 4 to 10 (more preferably 4 to 9, particularly 6 to 8). The dispersion (now modified) is then ready for subjection to the thermal treatment stage to cause simultaneous thermal stabilisation and isolation.

In the other preferred embodiment using a strong base, the strong base is titrated into the initial aqueous dispersion to raise its pH (usually from a minimum of about 2) direct and controllably to within the range of from 4 to 10 (more preferably 4 to 9, particularly 6 to 8).

The dispersion temperature range of the addition can be within the range 20° to 100° C., preferably within the range 60° to 95° C., particularly 60° to 80° C. The advantages of using this embodiment are that it reduces the number of process steps and reduces the concentration of inorganic materials in the reaction vessel and thus the concentration likely to be found on the isolated polymer.

In both of these embodiments described supra, the preferred strong bases are NaOH and KOH.

Addressing next the use of a weak base, and particularly weak bases derived from organic acids:

When using a weak base, the amount of base required is derived from the pH of the dispersion.

The initial pH of the dispersion is optionally first raised by a relatively small amount (say from an initial value of about 2 to 2.5 to about 3 to 3.8; this can be done by adding a small amount of a strong base such as KOH or NaOH). The pH of the dispersion is measured and the concentration of hydrogen ions determined.

Using this value, a number of equivalents of weak base is added sufficient to cause substantially complete conversion of carboxylic acid groups to carboxylate anion groups; a typical range is 1 to 7 (preferably 1.1 to 5) equivalents of base on a molar basis. The addition of the weak base is made at a dispersion temperature usually within the range of from 60° to 100° C., preferably 70° to 90° C. (typically around 80° C.). After the addition of the weak base to convert the carboxyl groups to carboxylate anion groups the dispersion is not necessarily alkaline (i.e. not necessarily pH $\geq 7$) and may well still be quite acidic (eg pH 3 to 4).

The dispersion (now modified) is then ready for subjection to the thermal treatment stage to cause simultaneous thermal stabilisation and isolation.

The preferred weak bases are the Na and K derivatives of organic acids, including formic, oxalic acetic and the other acids up to and including octanoic.

The temperature (or temperature range) which may be used to effectively perform the simultaneous carboxylate anion-removal and isolation stage (hereinafter the "reaction temperature") will (as mentioned supra) depend on the nature of the cation of the base used and hence on the nature of the carboxylate salt cation which is formed.

For methods involving the heat treatment of K carboxylate groups, the modified dispersion may usually be heated within the range of from 190° to 230° C. to ensure substantially complete removal of the carboxylate groups. Treatments involving Na metal counterions require somewhat higher temperatures, usually up to 240° C.

The time period for the thermal treatment is not particularly critical and eg may vary from "zero time", ie no dwell at "on temperature", to 2 hours or more at the reaction temperature (or reaction temperature range if one does not employ a steady reaction temperature).

Thus, after being treated with the appropriate quantity of the selected base, the modified dispersion is heated in a vessel (often, but not necessarily, the polymerisation autoclave) until the dispersion reaches the temperature selected as the reaction temperature. The temperature may be held at that value (or within a selected reaction temperature range) for a period of time or cooling may be applied to reduce the temperature immediately ("zero option") as discussed supra.

The success of the carboxylate group removal may be readily ascertained by analysing the polymer before and after the thermal treatment, using infra red spectroscopy.

It should be pointed out that an effective reaction temperature, while depending on the nature of metal counterion, is independent of the original source of the metal, ie whether or not it comes from a strong or a weak base.

After the simultaneous stabilisation/isolation stage of the method of the invention, there exists a mixture of two distinct phases, viz
(a) the floating agglomerated fluoropolymer particles and
(b) the aqueous phase.

The fluoropolymer may be readily separated from the bulk of the aqueous phase (dewatered) merely by simple techniques such as sequential discharging from the heat treatment vessel (usually the polymerisation reactor) which in effect is a form of decantation, or filtration or centrifuging.

The dewatered (but still damp) powder of agglomerates may thereafter be dried to substantially completely remove all the residual water.

The damp fluoropolymer powder may be washed after the isolation, following dewatering, to reduce the inorganic content of the polymer and to improve the colour of the final polymer. Washing may be conducted with a variety of reagents.

Although the use of water is beneficial the effect is restricted by the difficulty in achieving good contact between the low energy surface of the polymer and the high surface tension of water.

A variety of organic alcohols, ethers, ketones or esters may be used to reduce the surface tension of the aqueous phase of an aqueous washing medium to a value at which wetting of the polymer is adequate. Care must be taken to avoid reducing the surface tension too far otherwise emulsification will occur and it is extremely difficult to then separate the polymer and the aqueous mixture. The surface tension of the aqueous phase of the washing medium should preferably be between 35 and 55 dynes $cm^{-1}$. This may be achieved by using a mixture of 10% weight of isopropanol or acetone for example. Alternatively, the addition of eg 3% weight of butan-2-ol will also give good washing characteristics.

The method of the present invention is in principle applicable to all types of fluoropolymers.

The fluoropolymer will typically comprise repeat units derived from at least one fluoroolefine and, optionally, at least one olefinically unsaturated monomer which is not a fluoroolefine. Such fluoropolymers may be prepared by conventional fluoropolymer dispersion polymerisation processes.

Typically the fluoropolymer comprises
(a) 30–100 weight% (50–100 weight%) of units derived from said at least one fluoroolefine, and (b) 0-70 weight% (0-50 weight%) of other units (ie not derived from a fluoroolefine).

The at least one fluoroolefine is broadly defined as an olefine having at least one fluorine atom substituent; preferably the fluoroolefine is a perhaloolefine in which all the hydrogen atoms of the olefine are substituted with fluorine atoms and optionally other halogen atoms.

From the point of view of polymerisability and resulting polymer properties fluoroolefines having 2 or 3 carbon atoms are preferable.

Examples of such fluoroolefines include fluoroethylenes such as $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=ClF$; and fluoropropylenes such as $CF_3CF=CF_2$, $CF_3CF=CHF$, $CF_3CH=CF_2$, $CF_3CH=CH_2$, $CF_3CH=CH_2$, $CF_3CF=CHF$, $CHF_2CH=CHF$, and $CF_3CH=CH_2$.

Of the fluoroethylenes and fluoropropylenes listed above tetrafluoroethylene ($CF_2=CF_2$)TFE, chlorotrifluoroethylene ($CClF=CF_2$)CTFE, vinylidene fluoride ($CH_2=CF_2$)VDF, and hexafluoropropylene ($CF_2=CFCF_3$)HFP are particularly preferred.

Examples of non-fluoroolefines include, particularly, perfluoro(alkyl vinyl ethers) such as perfluoro(methyl vinyl ether) PPVE, and perfluoro(alkyl dioxoles) such as perfluoro(2,2-dimethyl-1,3-dioxole) PDD.

While in principle the invention is applicable to all types of fluoropolymers (as mentioned supra), the advantages afforded by its use are less significant to non-melt processable fluoropolymers such as PTFE (homopolymer) as discussed supra.

The invention is therefore most advantageously applied to melt-processable types of fluoropolymers and in particular to melt-processable copolymers of TFE with monomers selected from higher perfluoro α-olefines of 3 to 10 carbon atoms (particularly HFP) and perfluoro(alkyl vinyl ethers) of 3 to 10 carbons (particularly PPVE).

The fluoropolymer is especially a melt-processable TFE/HFP copolymer (FEP) having 5 to 20 weight% of HFP repeat units (preferably 8 to 16 weight%, particularly 8 to 13 weight% of HFP units, typically 10 weight%) and the corresponding proportion of TFE.

Copolymers of TFE/PPVE having 2 to 5 weight% PPVE (2 to 4 weight% PPVE. typically 3 weight%) are also especially useful.

The method of the invention effects substantial removal of the carboxylate anion groups (derived from the carboxylic acid groups) and yields stable groups in their place. It is reasonably well accepted by the prior art that these stable groups are —$CF_2H$ groups which arise from the reaction

$$—CF_2—CO_2—M^+ \rightarrow —CF_2H$$

(M is the counterion) although we would not wish to be bound by this.

We have found that the method of the invention will remove $\geq 95\%$ (usually $\geq 97.5\%$) of the polymer-bound carboxyl groups int he fluoropolymer.

The method of the invention also effects substantially complete isolation (separation) from the aqueous phase of the dispersion.

Our results indicate that a yield of polymer from the dispersion of $\geq 97$ wt% (eg 98.5 to 99.5 wt%) is usually obtained, with only a very small amount of fluoropolymer being retained in the aqueous phase.

The presence of the carboxylic acid groups in the fluoropolymer may be readily observed and measured by the use of infra red spectroscopy. A poly of suitable thickness is analysed using a Fourier transform infra spectrometer. The spectrum obtained is then manipulated by substracting from it a similar spectrum of a fluoropolymer that does not contain any reactive carboxylic acid groups. Such manipulation gives a spectrum containing peaks at 1812 and 1775 cm$^{-1}$ (inter alia).

These peaks are assigned to the free and bonded carboxylic acid groups on the polymer. The area of these peaks is related to the concentration of the respective carboxylic groups and is arbitrarily denoted as 100%. A similar spectrum is recorded after the stabilisation method has been carried out and a similar manipulation conducted. The ratio of the absorbances before and after stabilisation gives a measure of the degree of removal of the carboxylic acid groups and hence of the success of the stabilisation method.

The present invention is not illustrated by reference to the following examples.

EXAMPLE 1

This example relates to several runs of the same type.

To a jacketed stainless steel autoclave equipped with an inner stirrer was added a melt-processable TFE/HFP copolymer (FEP) dispersion (20 wt% solids).

The dispersed polymer was manufactured by dispersion polymerising TFE and HFP in an aqueous medium using potassium or ammonium persulphate initiators and ammonium perfluorooctanoate as surfactant.

The autoclave was filled to a 65% capacity with dispersion (pH 2.2) and potassium hydroxide solution (25% w/w) was added such that the autoclave contained 2 parts of potassium hydroxide per 200 parts of polymer on a dry weight basis causing the pH to rise to 11.5. The reactants were then heated at 90° C. for 1 hour before the dispersion was neutralised with nitric acid (the pH falling to 7.3). The autoclave was then heated to 215° C. and then cooling was immediately applied.

On cooling to 60° C., the autoclave was discharged. The first discharge was a clear aqueous phase followed by a fine white powder. If required, the powder may be retained in the autoclave to allow washing to be carried out. Analysis of the clear aqueous phase showed the presence of typically 0.2-0.4% by weight solids. Of this approximately 0.1% will be residual potassium nitrate. This implied a yield of polymer from the dispersion of between 98.5% weight and 99.5%

Analysis of the resulting fluoropolymer showed the absence of the characteristic absorbances associated with the free and bonded acid end groups at 1812 and 1775 cm$^{-1}$ respectively. Similarly the infra red spectra showed the absence of the hydroxyl stretch associated with the free carboxylic acid at 3550 cm$^{-1}$.

EXAMPLE 2

FEP dispersion (16.2 wt% solids) was added to a stainlesss steel autoclave fitted with an internal stirrer such that the liquid volume was 65% of the total autoclave volume.

The pH of the dispersion was then raised to 3.05 by the addition of potassium hydroxide in the form of a 25% (w/w) solution. Potassium acetate (2.67 ×10$^{-3}$ moles per litre of dispersion, corresponding to 3 equivalents in relation to the H$^+$ion concentration) was then added and the pH observed to rise to 3.5. The autoclave was then sealed and heated to 215° C. before the immediate application of cooling. Upon opening the autoclave, a two phase system comprising of a fine white powder and a clear aqueous phase was observed.

The aqueous phase was discarded and the polymer could be discharged or washed as required. Analysis of the aqueous phase showed the presence of 0.125 wt% residual solids, implying a minimum polymer recovery yield of 99.2 wt%.

Analysis of the polymer by infra red spectroscopy showed the presence of 2.3% of the reactive carboxylic acid end groups in the stabilised polymer compared to the (arbitrary) 100% concentration in the original precursor fluoropolymer before reaction, or in other words 97.7% of the reactive carboxylic end groups had been removed.

Further runs in the same vein are detailed in the following table.

mer implied that 97% of the carboxylic acid end groups had been removed.

Analysis of the polymer for transition metals showed extremely low concentrations of specific elements including: Fe 0.8 ppm and Cr<0.8 ppm.

EXAMPLE 5

FEP dispersion (20% wt solids) was added to a stainless steel autoclave equipped with an internal stirrer and diluted with water so as to give a liquid volume occupying 60% of the total autoclave volume. The dispersion was heated to 80° C. and potassium carbonate solution was added to raise the pH to 7.5 Hydrogen peroxide (2 litres of 35% w/w solution) was then added. The autoclave was then sealed and heated to 215° C. Cooling was then applied.

Once the temperature had reached 90° C., the aqueous contents were discharged. This left a fine white powder remaining in the autoclave. The polymer was

| pH of DISPERSION AFTER KOH ADDITION | NO. OF MOLES OF K ACETATE ADDED PER L OF DISPERSION | REACTION TEMP. (°C.) | % OF ACID GROUPS REMOVED FROM POLYMER |
|---|---|---|---|
| 3.58 | $5.26 \times 10^{-4}$ | 215 | 97.8 |
| 3.65 | $4.48 \times 10^{-4}$ | 215 | 98.7 |
| 3.50 | $3.48 \times 10^{-4}$ | 215 | 97.8 |

EXAMPLE 3

FEP dispersion (15.0 wt% solids) was added to a stainless steel autoclave equipped with an internal stirrer so as to give a liquid volume occupying 60% of the total autoclave volume.

Sodium hydroxide solution (25% w/w) was then added to the dispersion so that the pH was raised to a value of 7.5 (titration). The autoclave was then sealed and heated to 230° C. Cooling was then applied. Once the temperature was reduced to below 80° C., the contents could be discharged.

The contents were a two phase mixture comprising of a fine white powder and a clear aqueous phase.

Analysis of the aqueous phase implied a minimum polymer isolation yield of 99.3%. Analysis of the polymer by infra red spectroscopy showed that 90% of the carboxylic acid groups had been removed.

EXAMPLE 4

FEP dispersion (18.5% wt solids) was added to a stainless steel autoclave fitted with an internal stirrer and diluted with water so as to give a liquid volume occupying 60% of the total autoclave volume.

The dispersion was then heated to 80° C. before the pH was raised to 8.6 by the addition of potassium hydroxide solution (25% w/w) (titration).

This was followed by the addition of 2 litres of hydrogen peroxide solution (35% w/w). The autoclave was sealed and then heated to a temperature of 215° C. At this point cooling was applied. Once the temperature had been reduced to 90° C., the aqueous phase was discharged. This left a fine white powder remaining in the autoclave.

The polymer was then washed with water and a mixture of isopropanol and water in a sequential manner.

The alcoholic wash liquor consisted of 1 part isopropanol to 9 parts of water.

The powder was then discharged from the autoclave and dried. Analysis of the infra red spectra of the poly-then washed with water and a mixture of isopropanol and nitric acid in a sequential manner.

The alcoholic mixture consisted of 1 part of isopropanol to 9 parts of dilute nitric acid.

The polymer was then discharged and dried. Analysis of the polymer by infra red spectroscopy showed that 98.4% of the carboxylic acid end groups had been removed.

Analysis of the polymer for transition metal content showed extremely low levels of specific elements including Fe and Cr.

I claim:

1. A method for the production of a melt-fabricatable fluoropolymer, by the conversion of a fluoropolymer bearing carboxylic acid groups and prepared as an aqueous dispersion using a dispersion polymerisation process which employs a dispersing agent whose dispersion-stabilising effect is removable by heating the dispersion to a temperature of 190° C. to 240° C. and an initiator which yields carboxylic acid groups on the fluoropolymer, which method comprises, after preparing an aqueous dispersion of the fluoropolymer using dispersion polymerisation, converting the carboxylic acid groups on the fluoropolymer in the aqueous dispersion to carboxylate anion groups using a base and then heating the comodified fluoropolymer dispersion to a temperature of 190° C. to 240° C. to cause simultaneously:
   (1) substantial removal of carboxylate anion groups, thereby to yield stable groups in their place, and
   (2) isolation of the melt-fabricatable fluoropolymer from the dispersion by coagulation of the fluoropolymer dispersion.

2. A method according to claim 1, wherein the dispersion agent is an ammonium or alkali metal salt of a higher perfluoroalkanoic acid.

3. A method according to claim 1, wherein the dispersion agent is a sodium, potassium or ammonium perfluorooctanoate, perfluorononanoate or perfluorodecanoate.

4. A method according to claim 1, wherein the base is a hydroxide, phosphate, carbonate, bicarbonate, $C_1$-$C_{10}$ monocarboxylic acid or $C_1$-$C_{10}$ polycarboxylic acid salt of an alkali or alkaline earth metal.

5. A method according to claim 1, wherein the base is a sodium or potassium salt.

6. A method according to claim 1, wherein the base fluoropolymer comprises 30-100 weight% of units derived from at least one fluoroolefine (defined as an olefine having at least one fluorine atom substituent) and 0-70 weight% of other, non-fluoroolefine units.

7. A method according to claim 6, wherein the fluoroolefine is selected from $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=ClF$; $CF_3CF=CF_2$, $CF_3CF=CHF$, $CF_3CH=CF_2$, $CF_3CH=CH_2$, $CF_3CH=CH_2$, $CF_3CF=CHF$, $CHF_2CH=CHF$, and $CF_3CH=CH_2$.

8. A method according to claim 6, wherein the non-fluoroolefine is selected from perfluoro(alkylvinyl ethers) and perfluoro(alkyl dioxoles).

* * * * *